No. 713,917. Patented Nov. 18, 1902.
J. F. POPE.
RESILIENT SPRING FOR WHEELED VEHICLES.
(Application filed July 13, 1901.)
(No Model.)
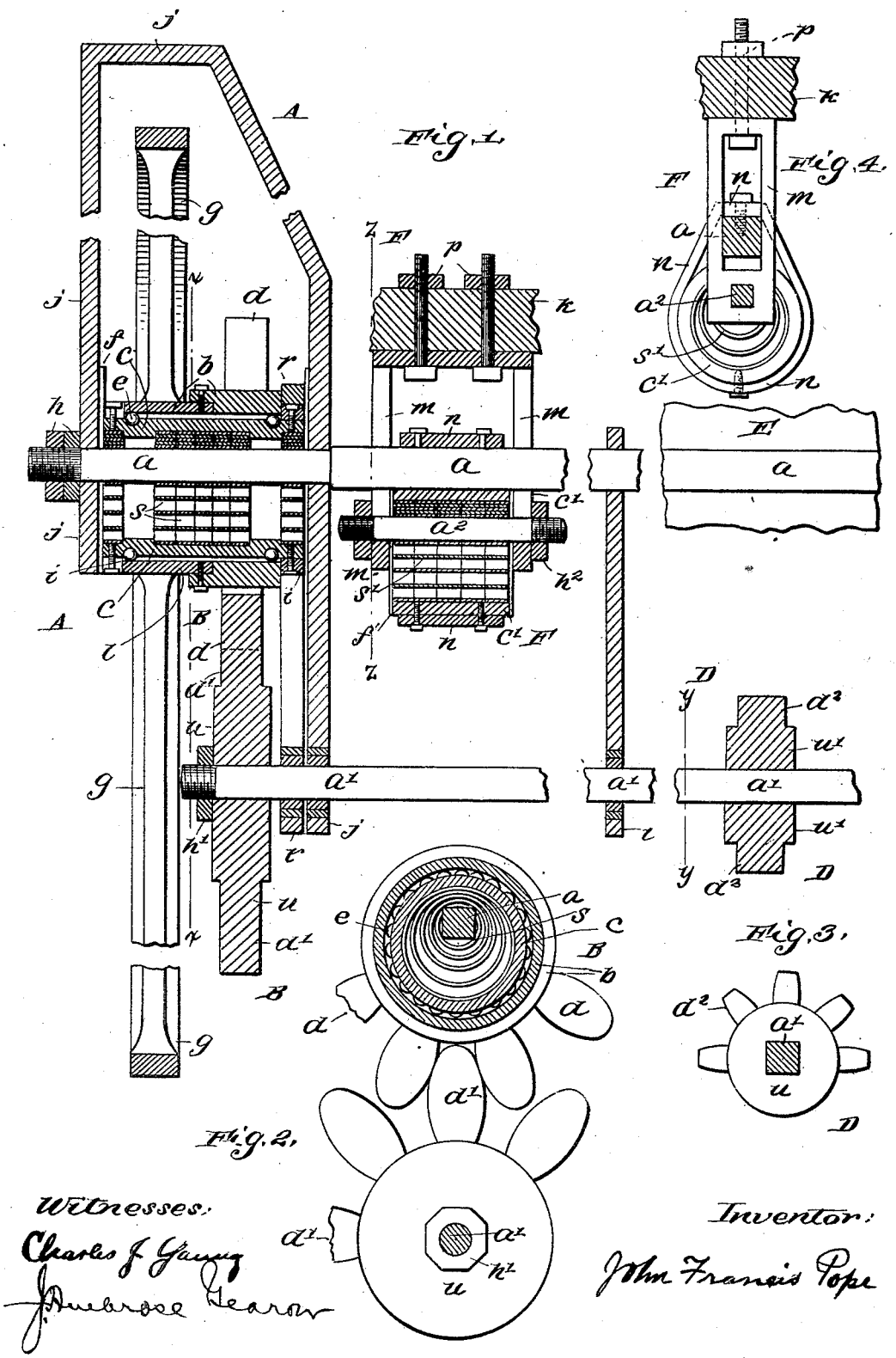

UNITED STATES PATENT OFFICE.

JOHN FRANCIS POPE, OF CHICAGO, ILLINOIS.

RESILIENT SPRING FOR WHEELED VEHICLES.

SPECIFICATION forming part of Letters Patent No. 713,917, dated November 18, 1902.

Application filed July 13, 1901. Serial No. 68,241. (No model.)

*To all whom it may concern:*

Be it known that I, JOHN FRANCIS POPE, a citizen of the United States, residing at Chicago, in the county of Cook and State of Illinois, have invented a new and useful Combination of Resilient Springs for Wheeled Vehicles, of which the following is a specification.

My invention relates to improvements in the resilience or ease from jolting to which carriages and other wheeled vehicles are subject on rough roads, and for which easement from jolting springs and air-tubes of various forms and designs are provided.

My new invention is especially adapted to automobile wheeled vehicles or those carrying their own motive power; and it consists of the mechanical combination of sets of springs on which is resiliently borne, by means of shafts set in these springs, the whole weight of the vehicle and its automobile propelling mechanism, the whole forming a combined resilient mechanism not only giving ease and comfort to the passengers, but also protecting the motor-power and its propelling mechanism in all its various parts from jolts and jars, thus enabling it to perform its duty more safely and with less liability to the displacement and injury of its parts. I attain these objects by the mechanism illustrated in the accompanying drawings, in which—

Figure 1 is a longitudinal vertical section through the center of the hub of one of the hind wheels of the vehicle and the axle connecting these hind wheels, showing both the resilient and propelling mechanism of the invention and the manner in which these different parts are connected together. Fig. 2 is a vertical cross-section along the broken line $x\ x$ of Fig. 1 through the hub of one of the hind wheels and an end view of the outer propelling cog-wheel acting on this hind wheel to move the vehicle. Fig. 3 is an end view along the broken line $y\ y$ of Fig. 1 of the main driving-wheel directly acted on by the motor-power of the vehicle. This wheel by the revolution of itself and its axle sets in motion the propelling mechanism shown in Fig. 2. Fig. 4 is an end view along the broken line $z\ z$ of Fig. 1 of one of the additional resilient springs fixed on the axle of the wheels of the vehicle and giving additional independent resilience to the upper body or seat-frame of the vehicle, which is wholly supported on the additional springs.

Similar letters refer to similar parts throughout these views.

To more conveniently describe the different parts of the mechanism they are marked A A, B B, D D, E, and F F on the drawings, the details of each being indicated by small letters.

A A represents the hub $b$ of one of the hind wheels of the vehicle, with resilient voluted springs $s$ inclosed in a case $c$ inside the hub. The axle $a$, connecting the hind wheels of the vehicle, is supported on the voluted springs $s$. The hub $b$ has also projecting teeth $d$ rigidly fixed on it.

B B represents the propelling mechanism acting directly on the hind wheel of the vehicle, which is made to revolve by the rotary action communicated to it by the contact of the teeth $d'$ of the cog-wheel $u$ with the teeth $d$ of the hub $b$.

D D represents the main or principal driving-wheel $u'$, acted on by the motor-power E. This driving-wheel $u'$ is rigidly connected to the cog-wheel $u$ by the continuous shaft $a'$.

E represents the motor-power of the vehicle, which may be either steam or electricity, located on the axle of the vehicle-wheels. The power generated in the motor E is to be applied to the driving-wheel $u'$ by any convenient means.

F F represents the mechanism showing how the body or seat frame of the vehicle receives separate independent additional resilience by means of the voluted springs $s'$, fixed on the axle $a$ of the vehicle-wheels.

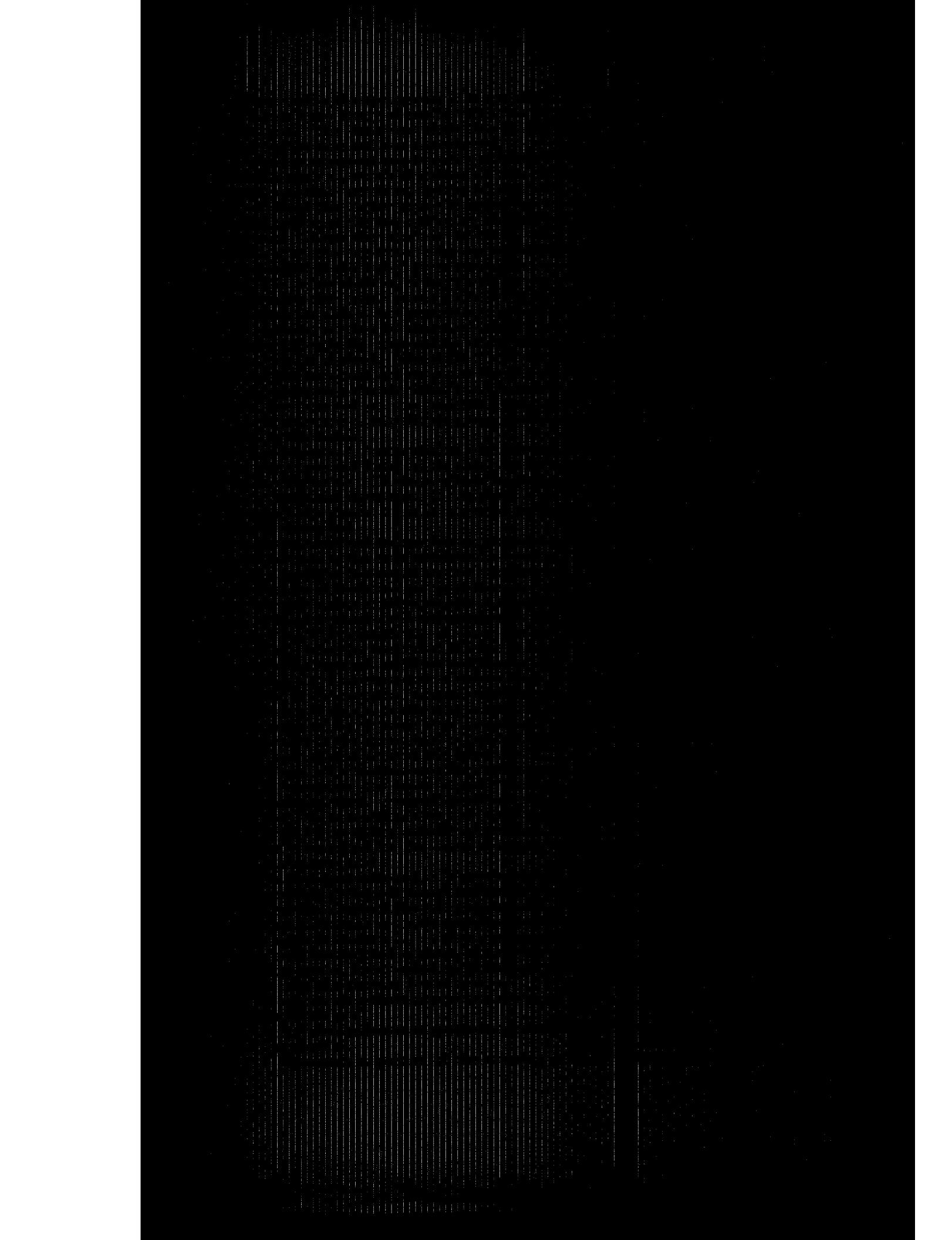

The details of these subheads are as follows: $a$ represents the axle of the two hind wheels resiliently supported on the resilient-voluted springs $s$. These springs are incased in $c$, whose projecting ends form a receptacle for the ball-bearing device $e$, on which revolves the hub $b$ of the wheel of the vehicle. This hub for convenience of assembly may be made in two parts, as shown in the drawings. The spokes $g$ may thus be conveniently attached to the outer part of the hub and the projecting cogs or teeth $d$ to the inner side. Instead of having one large voluted resilient